United States Patent [19]
Okano et al.

[11] Patent Number: 4,740,038
[45] Date of Patent: Apr. 26, 1988

[54] WHEEL COVER

[75] Inventors: Takashi Okano, Nakashima; Kazuo Ogawa, Nagoya; Mitsutoshi Ito, Aichi, all of Japan

[73] Assignee: Sakae Riken Kogyo Co., Ltd., Aichi, Japan

[21] Appl. No.: 860,871

[22] Filed: May 8, 1986

[51] Int. Cl.4 .............................................. B60B 7/04
[52] U.S. Cl. ............................ 301/37 PB; 301/37 TP; 301/37 R
[58] Field of Search ................ 301/37 R, 37 P, 37 C, 301/37 CD, 37 TP, 37 PB

[56] References Cited

U.S. PATENT DOCUMENTS

| | | | |
|---|---|---|---|
| 2,694,604 | 11/1954 | Gabardi | 301/37 R |
| 3,747,984 | 7/1973 | Andrews et al. | 301/37 P |
| 4,027,919 | 6/1977 | Foster et al. | 301/37 P X |
| 4,352,525 | 10/1982 | Foster et al. | 301/37 P X |
| 4,366,992 | 1/1983 | Enke | 301/37 P |
| 4,457,559 | 7/1984 | Renz | 301/37 R X |
| 4,470,639 | 9/1984 | Loper | 301/37 P X |
| 4,531,786 | 7/1985 | Renz et al. | 301/37 P X |
| 4,596,425 | 6/1986 | Hung | 301/37 P |

FOREIGN PATENT DOCUMENTS

| | | | |
|---|---|---|---|
| 0187228 | 7/1986 | European Pat. Off. | 301/37 CD |
| 0079703 | 6/1980 | Japan | 301/37 P |

Primary Examiner—Johnny D. Cherry
Assistant Examiner—Russell D. Stormer
Attorney, Agent, or Firm—Larson and Taylor

[57] ABSTRACT

A wheel cover wherein a plurality of struts are formed integral on the back face circumference of the wheel cover made of synthetic resin, a wire ring is fitted into inner recesses in the struts, and engagement pieces made of synthetic resin are fitted from outside onto the struts, respectively, to fix the wire ring to the struts. The wheel cover can be mounted on the wheel rim in such a way that the engagement pieces thus assembled with the struts are pressed onto the hump portion of the wheel rim.

8 Claims, 6 Drawing Sheets

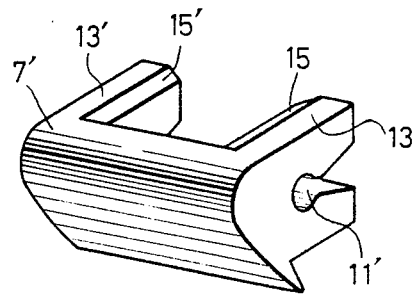
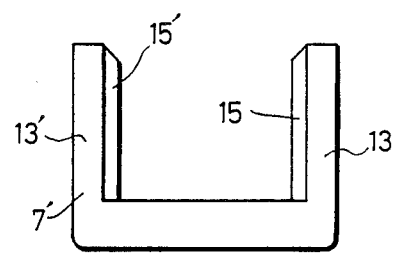
FIG. 6a
FIG. 6b
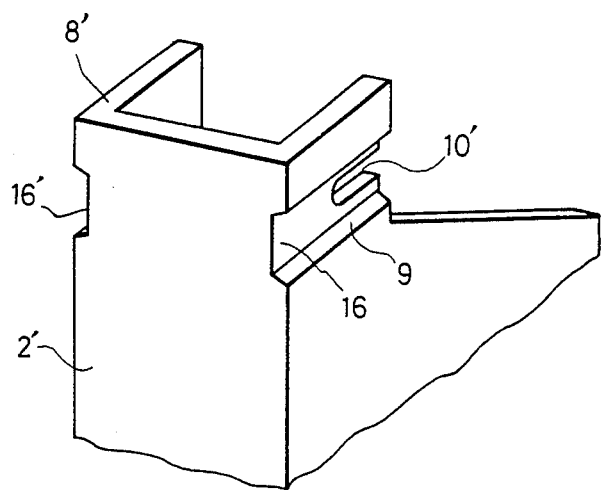
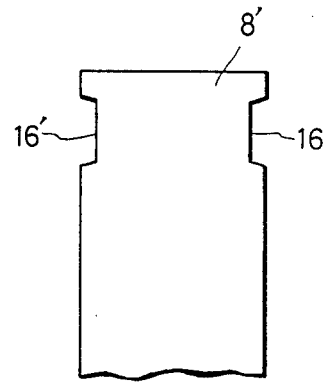
FIG. 7a
FIG. 7b

WHEEL COVER

BACKGROUND OF THE INVENTION

The wheel covers for use with vehicle wheels have become various in their design these days and those which are made not of metals but synthetic resins have become popular from the viewpoint of reducing the weight of vehicle. On the other hand, the speed of vehicles has become higher and higher, following the development of highways. The falling-off of the wheel covers from the vehicle wheels will therefore cause serious accident and it is thus seriously needed that the wheel covers are so reliably attached to the vehicle wheels that they can be prevented from falling off the vehicle wheels.

Some of the conventional manners of mounting the wheel cover on the wheel rim comprise fixing a spring wire or plate to the holder wall (or flange portion) on the back circumference of the wheel cover and engaging this spring member such as the spring wire or plate with the hump portion of the wheel rim. However, these manners of engaging the spring member directly with the wheel rim have the following drawbacks.

The spring member is contacted with the wheel rim at a few portions thereof. Therefore, its rigidity must be made strong and its attaching to the wheel rim must be made solid. Strong urging force is thus applied locally to those portions of the wheel rim with which the wheel cover is attached, and this causes a creaking sound while the vehicle is running.

When the rigidity of the spring member is made strong, the flexibility thereof becomes worse. As the holder wall of the wheel cover by which the spring member is held becomes fatigued and deformed, the force with which the wheel cover is fixed to the wheel rim is extremely reduced. When a new wheel cover is to be attached, therefore, extremely large force is needed to detach the old wheel cover from the wheel rim and attach the new one to it, but when the wheel covers are repeatedly exchanged like this and used, they become prone to easily fall off from the wheel rims by extremely small force applied from outside while the vehicle is running.

The manner of urging metal parts such as the spring member directly onto the wall of the wheel rim damages and rusts the wheel rim wall. When the rust on the wheel rim wall progresses, the progressed rust will make the running vehicle seriously unsafe.

The wheel cover disclosed by U.S. Pat. No. 4,027,919 comprises inserting loop projections, which extend outwardly from a metal ring element, into passageways in the flange portion and pressing the loop projections onto the wheel rim to hold the wheel cover fixed to the wheel rim. However, the force with which the wheel cover is fixed to the wheel rim is insufficient in this case and it will happen that the wheel cover falls off from the wheel rim or will idle on the wheel rim while the vehicle is running. In addition, the wheel rim will be damaged by this manner of pressing the loop projections onto the wheel rim, as described above.

In order to prevent the wheel rims from being damaged, DEP No. 2937083.0 (Pre-opened Japanese Application No. Sho 56-47301) discloses that the projections are covered by cover pieces formed integral to the wheel cover and then pressed onto the wheel rim. However, engagement between brackets (which correspond to the above-mentioned projections) of a wire ring and the wheel cover is complicated in this case. In addition, this wheel cover cannot be applied to all of wheel rims which are various in size, and it is not economical accordingly.

Pre-opened Japanese Utility Model Application No. Sho 56-25601 discloses that those portions of the wheel cover which are pressed onto the wheel rim are formed as engagement pieces made of synthetic resin and that these engagement pieces are pressed onto the wheel rim by a wire ring attached to the wheel cover. However, the arrangement of pressing the synthetic resin pieces onto the wheel rim is insufficient in construction and the sufficiency of the engagement force between the wheel cover and the wheel rim is doubtful. Japanese Utility Model Publication No. Sho 60-7921 discloses that engagement pieces which are slidably guided by passageways in struts of the wheel cover are pressed onto the wheel rim, but it may be said that this concept is derived from the abovementioned U.S. Pat. No. 4,027,919.

SUMMARY OF THE INVENTION

The present invention relates to a wheel cover made of synthetic resin and used together with the vehicle wheel.

According to the present invention, an annular wire spring (or wire ring) is fitted into inner recesses in struts on the circumference of the back face of a wheel cover, engagement pieces are fitted onto the wire ring from outside the struts to hold the wire ring fixed to the struts, and the engagement pieces are then pressed onto the hump portion of the wheel rim to hold the wheel cover attached to the wheel rim.

According to the present invention, the wire ring is fitted into the inner recesses in the struts to urge the struts outwards, the engagement pieces are fitted onto the wire ring from outside the struts to hold the wire ring fixed to the struts, and the engagement pieces are then pressed onto the hump portion of the wheel rim. Therefore, the wheel cover can be reliably and solidly fixed to the wheel rim and when the wheel cover is to be attached to and detached from the wheel rim, it can be smoothly achieved with moderate force.

An object of the present invention is to provide a wheel cover which can be reliably fixed to the wheel rim.

Another object of the present invention is to provide a wheel cover which cannot damage the wheel rim.

A further object of the present invention is to provide a wheel cover which can be easily attached to and detached from the wheel rim.

A still further object of the present invention is to provide a wheel cover whose attaching and detaching can be left smooth over a long term of use.

A still further object of the present invention is to provide a wheel cover which can be applied to any size of the wheel rims by exchanging the engagement pieces.

These and other objects will be achieved by the wheel cover provided by the present invention and some of embodiments of the present invention will be described below in detail with reference to the accompanying drawings.

It should be understood that various changes and modifications can be made to the present invention without departing from the scope of the present invention and that these changes and modifications can be included in claims appended hereto.

BRIEF DESCRIPTION OF THE DRAWINGS

FIG. 1b is a sectional view taken along a line I-I' in FIG. 1a.

FIGS. 1c through 1e are partial views showing other examples of the wire ring shown in FIG. 1a.

FIG. 6a is a perspective view showing another example of the engagement piece.

FIG. 6b is a top view showing the engagement piece in FIG. 6a.

FIG. 7a is a perspective view showing the top portion of the strut to which the engagement piece shown in FIGS. 6a and 6b is applied.

FIG. 7b is a front view showing the top portion of the strut in FIG. 7a.

DETAILED DESCRIPTION OF THE PREFERRED EMBODIMENTS

Figure 1A:
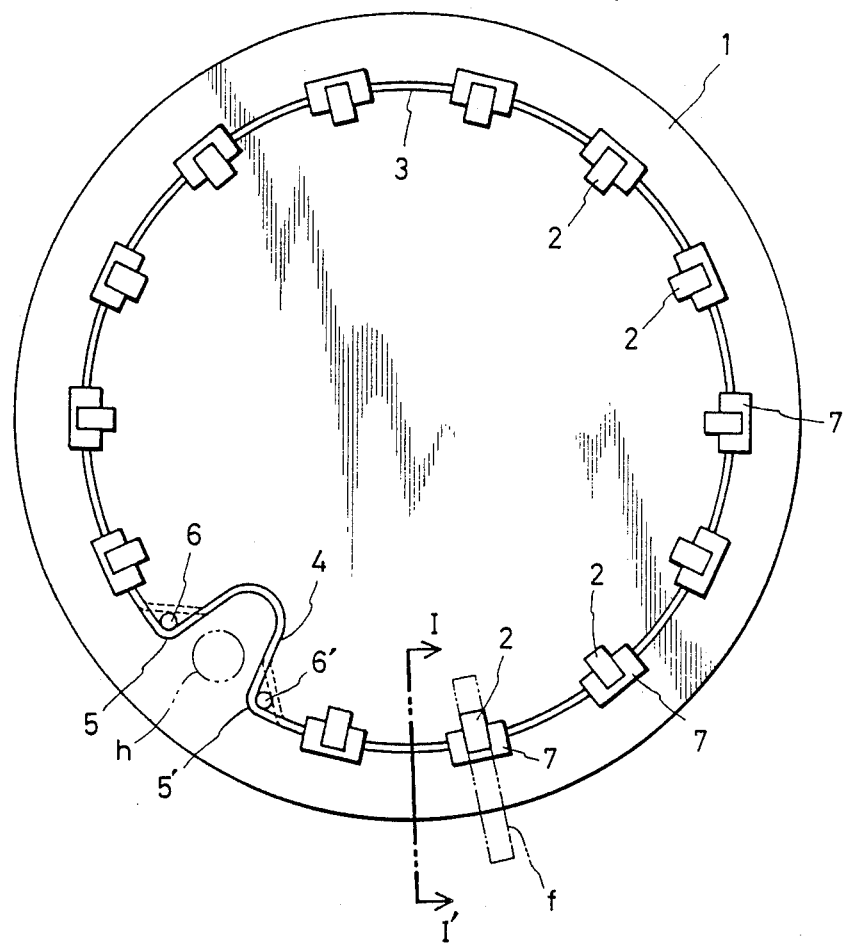
FIG. 1a is a view showing the back face of a wheel cover according to the present invention.
Figure 1B:
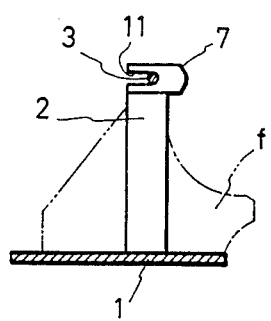

FIG. 1a shows a wheel cover 1 made of synthetic resin, on whose back face are formed a plurality of struts 2 in a ring shape with a certain space interposed between the struts 2. These struts 2 may be projected outward of the wheel cover 1 to form decorating and cooling fins (f). An annular wire spring (or wire ring) 3 made of steel is fitted from inside the struts 2 into inner recesses 10 at the upper portions 8 of the struts 2, which will be described later, and also into passageways 11 of engagement pieces 7, which will also be described later. (See FIG. 1b).

The wire ring 3 is provided with a U-shaped portion 4, whose bases 5 and 5' are engaged with pins 6 and 6' on the back face of the wheel cover 1 to let the U-shaped portion 4 have appropriate spring capacity. Bias or pre-load pressure can be thus applied to the wire ring 3 to enable the wire ring 3 to be more tightly attached to the wheel cover 1.

Figure 1C:
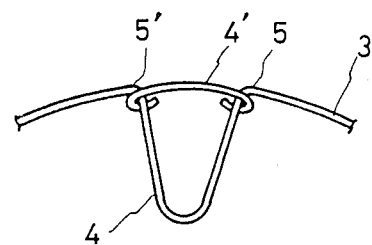
Figure 1D:
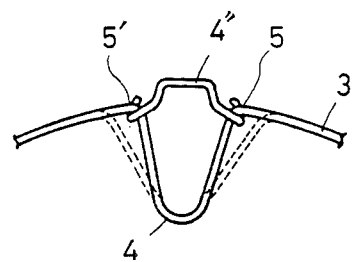

In order to let the U-shaped portion 4 have the spring capacity, holder pieces 4' and 4" shown in FIGS. 1c and 1d may be used to bridge the bases 5 and 5' of the U-shaped portion 4.

Figure 1E:
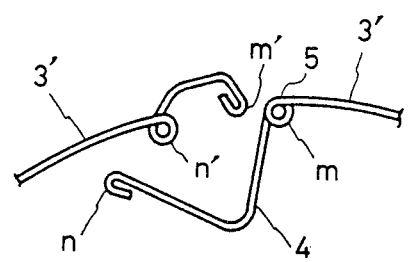
Figure 1F:
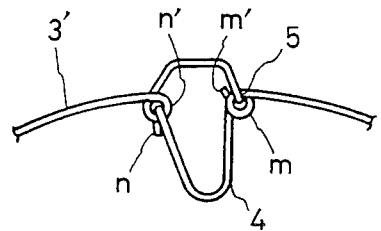
FIG. 1f shows the wire ring of FIG. 1e engaged.

In the case of parts of a wire ring 3' shown in FIGS. 1e and 1f, a first loop (m) is formed at one base 5 of the U-shaped portion 4 of one ring part 3', while the other base thereof is formed like a hook (n), which is engaged with a second loop (n') of the other ring part 3'. The front end of the other ring part 3' is extended from the second loop (n'), projecting upward and then forming a hook (m') at the end thereof, which is engaged with the first loop (m), so that these ring parts 3' and 3' can be engaged with each other like a bridge.

The wire ring 3 may be provided with plural U-shaped portions, but when it is provided with one U-shaped portion, this U-shaped portion 4 is located to embrace the hole (h) of an air valve shown by a two-dot-and-dash line in FIG. 1a.

Figure 2:
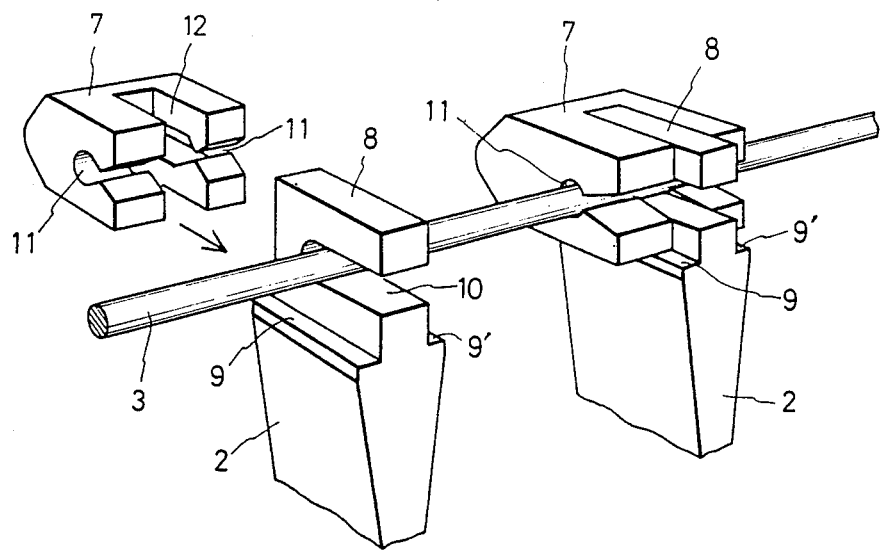
FIG. 2 is a perspective view showing an engagement piece engaged with a strut.

As shown in FIG. 2, each of the struts 2 is sandwiched from outside by the engagement piece 7 made of synthetic resin.

FIG. 2 shows on the left side thereof the condition under which one engagement piece 7 is about to be attached to the strut 2, and on the right side thereof the condition under which the other engagement piece 7 has been attached to the strut 2. The upper end portion 8 of the strut 2 is made narrow to form stepped portions 9 and 9' on both sides thereof and it is provided with an inner recess 10 radially cut into it from inside. The wire ring 3 is pushed into this inner recess 10 at the upper end portion 8 of the strut 2. On the other hand, the engagement piece 7 is provided with a passageway 11 formed in the center thereof and opened inwardly in the traverse direction, while it is also provided with a slit 12 formed perpendicular to the passageway 11 and opened inwardly in the vertical direction thereof.

As shown on the right side thereof in FIG. 2, the engagement piece 7 is attached to the strut 2, fitting its slit 12 onto the upper end portion 8 of the strut 2 and sliding its underside on the stepped portions 9 and 9', while holding the wire ring 3 in its passageway 11.

Figure 3:
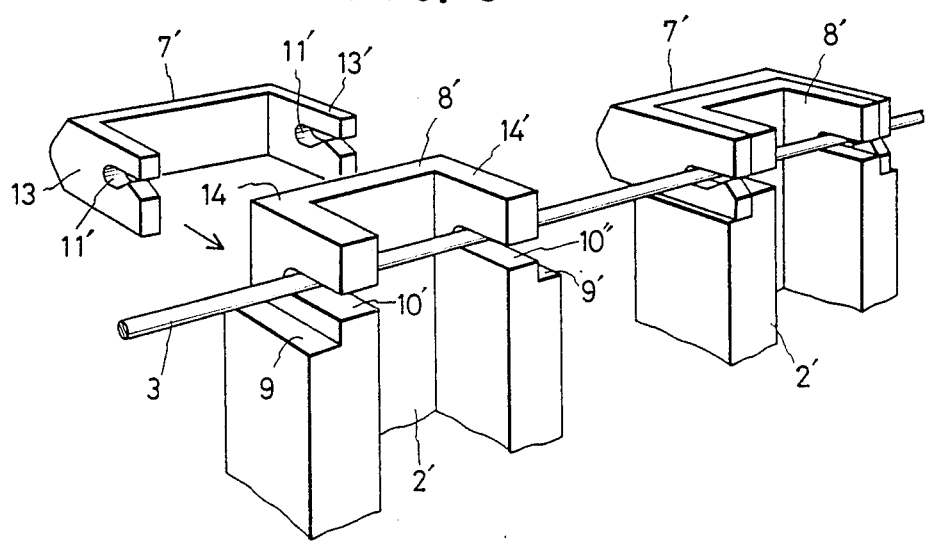
FIG. 3 is a perspective view showing another example of the strut and the engagement piece engaged.

FIG. 3 shows another example of the strut and engagement piece, wherein both sides 13 and 13' of an engagement piece 7' are provided with passageways 11' opened inwardly in the traverse direction thereof, while both sides 14 and 14' of a strut 2' at the upper end portion 8' thereof are provided with inner recesses 10' and 10" cut into them from inside. As shown on the right side thereof in FIG. 3, the engagement piece 7' is fitted onto the upper end portion 8' of the strut 2', holding the wire ring 3 therein.

Figure 4A:
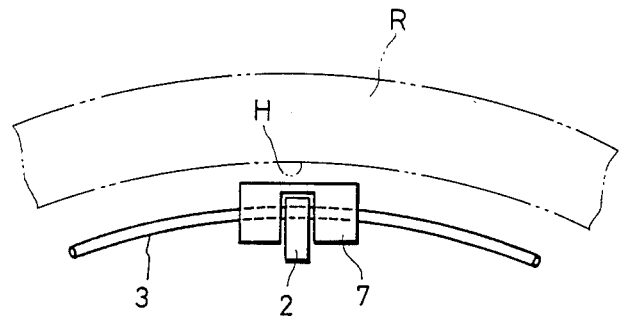
FIG. 4a shows the wheel cover which is about to be attached to the wheel rim.
Figure 4B:
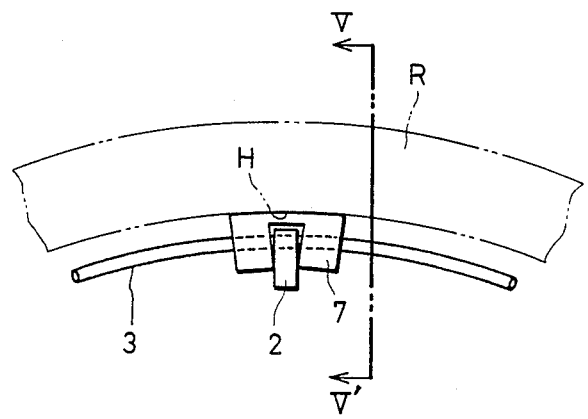
FIG. 4b shows the wheel cover attached to the wheel rim.

FIG. 4a shows the engagement piece 7 which is about to be contacted with the hump portion (H) of the wheel rim (R), while FIG. 4b shows the engagement piece 7 contacted and engaged with the hump portion (H) of the wheel rim (R). (See FIG. 8b which will be described later).

Figure 5:
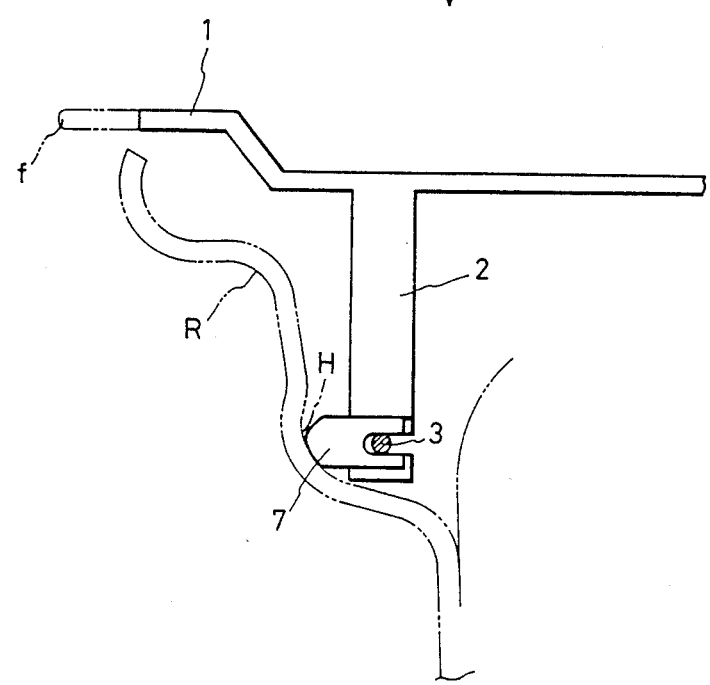
FIG. 5 is a sectional viewtaken along a line V-V' in FIG. 4.

FIG. 5 is a sectional view taken along a line V-V' in FIG. 4b to show the state in FIG. 4b.

FIGS. 6a, 6b, 7a and 7b show further examples of the strut and engagement piece wherein inner portions of the both sides 13 and 13' of the engagement piece 7' are used as fitting projections 15 and 15', while the upper portion 8' of the strut 2' is provided with recesses 16 and 16' to receive the fitting projections 15 and 15' at the outer sides thereof.

Figure 8A:
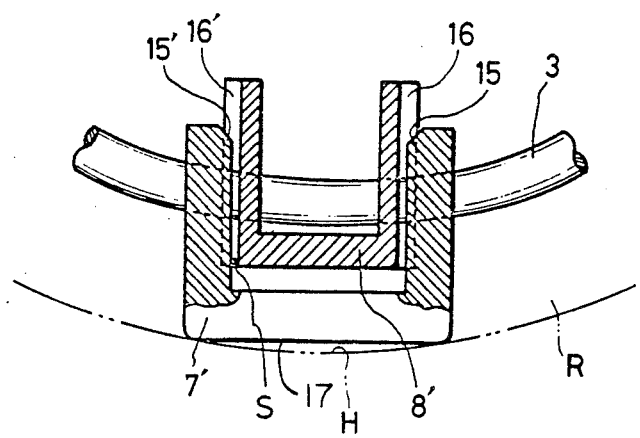
FIG. 8a is a partially sectioned view showing the top portions of the strut and engagement piece, which are shown in FIGS. 6a, 6b, 7a and 7b, contacted with the wheel rim.

It will be described below in detail how the engagement pieces fitted onto the struts are pressed onto the hump portion (H) of the wheel rim (R). As shown in FIG. 8a, the fitting projections 15 and 15' of the engagement piece 7' are fitted into the recesses 16 and 16' of the strut 2', each having a clearance (s) relative to its corresponding recess, when the engagement piece 7' is engaged with the strut 2', fitting its projections 15 and 15' into the recesses 16 and 16' of the strut 2', and this assembly of the engagement piece and strut is contacted with the hump portion (H) of the wheel rim (R).

Figure 8B:
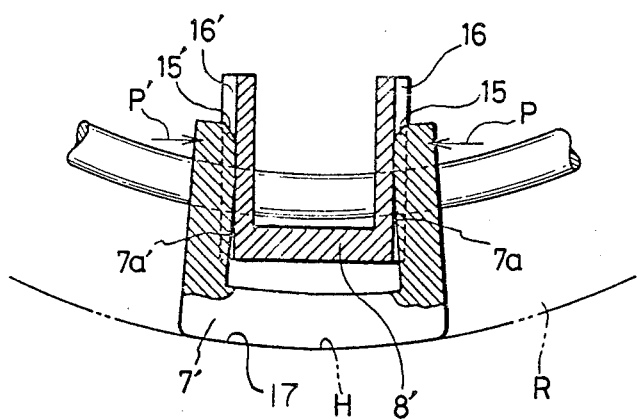
FIG. 8b is a partially sectioned view showing the top portions of the strut and engagement piece in FIG. 8a further contacted with the wheel rim.

When the engagement piece 7' is pressed onto the hump portion (H) of the wheel rim (R), both sides of the engagement piece 7' are urged inward or in the directions shown by arrows P and P' in FIG. 8b by the extensible force of the wire spring 3 and the fitting projections 15 and 15' of the engagement piece 7' are tightly contacted with the recesses 16 and 16' to solidly hold the upper end portion 8' of the strut 2', so that the whole of the engagement piece 7' can be strongly fixed to the hump portion (H) of the wheel rim (R).

According to the present invention, the wire ring is fitted into the struts on the back face of the wheel cover, the engagement pieces sandwich the struts, respectively, and the assemblies of the engagement pieces and struts are contacted with the wheel rim. Therefore, the engagement pieces are, pressed onto the hump portion of the wheel rim by the extensible force of the wire ring to thereby reliably fix the wheel cover to the wheel rim.

Further, the attaching and detaching of the wheel cover to and from the wheel rim can be smoothly achieved with moderate force and left smooth over a long term of use due to the spring capacity of the wire spring pressed. Since the engagement pieces are made of synthetic resin, those portions of the wheel rim with which the engagement pieces are contacted can be left not flawed.

When the wheel covers are to be used common to the wheel rims of 13 and 14 inches, the engagement pieces may be changed in size. Further, the engagement pieces can be easily molded to have any shape which can meet the contours of the wheel rims.

We claim:

1. A wheel cover for covering a wheel rim comprising:
   a generally circular cover member made of a synthetic resin, said cover member having a circumference, a center, and a back face which is located adjacent the wheel rim;
   a plurality of struts which are formed integral with said cover member, which are spaced about and adjacent the circumference, and which extend perpendicularly from said back face, each said strut having an inner recess which is radially directed outwardly from the center of said cover member;
   a wire ring which is fitted into said inner recesses of said struts; and
   a plurality of separate engagement pieces made of a synthetic resin, each said engagement piece including a pair of adjacent sides with each said side being provided with a radial slot for the reception of said wire ring, an inner slit provided between said sides between which a respective said strut is located, and an outer ridge engaging surface which is adapted to engage the rim as said cover member is pressed against the rim whereby said engagement pieces push radially against said wire ring and said sides of said engagement pieces engage respective adjacent said struts.

2. A wheel cover according to claim 1 wherein said wire ring is provided with at least one U-shaped portion.

3. A wheel according to claim 2 and further including two adjacent pins projecting from the back face of said cover member, and wherein the U-shaped portion of said wire ring has a pair of bases which bases engage a respective said one of said pins such that said wire ring is preloaded by engagement with said pins.

4. A wheel cover according to claim 2 wherein the U-shaped portion of the wire ring has a pair of bases with outer ends, and further includes a holder piece which draws said outer ends of said bases together such that said that said wire ring is preloaded by said holder piece.

5. A wheel cover according to claim 2 wherein said wire ring is split and consists of first and second end portions having ends, said first end portion forming the U-shaped portion which U-shaped portion has a pair of bases, and wherein said first end portion forms the pair of bases with a hook formed at the end of said first end portion adjacent one base and with a first loop formed at an end of the other base of the U-shaped portion, and said second end portion forms a second loop and a hook at the end thereof such that said hook of said first end portion is engaged with the second loop of the second end portion while said hook of the second end portion is engaged with the first loop of said first end portion to prelo to preload said wire ring.

6. A wheel cover according to claim 1 wherein each of the struts includes a fin which is projected outward from the wheel cover.

7. A wheel cover according to claim 1 wherein each of the engagement pieces includes a pair of adjacent sides having opposed faces on which projections are provided and each strut includes an upper portion having outer opposed faces on which a recess is provided such that each said engagement piece is engaged with a respective said strut in such a way that said projections on said inner side faces of both sides of said engagement piece are fitted into corresponding said recesses on said outer side faces of the upper end portion of the strut.

8. A wheel cover as claimed in claim 1 wherein each said engagement piece includes a bottom and wherein said slit in each said engagement piece extends into said engagement piece a sufficient depth such that said bottom is spaced from said respective strut when the wheel cover is engaged to the wheel rim.

* * * * *